US012792287B2

(12) United States Patent
Chen

(10) Patent No.: US 12,792,287 B2
(45) Date of Patent: Nov. 10, 2026

(54) DUAL RESOLUTION DISPLAY WITH A SHARED BACKLIGHT

(71) Applicant: LITEMAX ELECTRONICS INC., New Taipei City (TW)

(72) Inventor: Ching-Chang Chen, New Taipei City (TW)

(73) Assignee: LITEMAX ELECTRONICS INC., New Taipei City (TW)

( * ) Notice: Subject to any disclaimer, the term of this patent is extended or adjusted under 35 U.S.C. 154(b) by 196 days.

(21) Appl. No.: 18/823,723

(22) Filed: Sep. 4, 2024

(65) Prior Publication Data

US 2026/0064347 A1 Mar. 5, 2026

(51) Int. Cl.
*G06F 3/14* (2006.01)
*G09G 5/00* (2006.01)

(52) U.S. Cl.
CPC ........... *G06F 3/1446* (2013.01); *G09G 5/005* (2013.01); *G09G 2340/0407* (2013.01)

(58) Field of Classification Search
CPC .............................. G09G 5/005; G06F 3/1446
USPC .......................................................... 345/102
See application file for complete search history.

(56) References Cited

U.S. PATENT DOCUMENTS

| | | | | |
|---|---|---|---|---|
| 9,503,288 B2 * | 11/2016 | Kumar | H04L 25/0272 | |
| 2007/0285413 A1 * | 12/2007 | Wong | G09G 5/00 | 345/1.1 |
| 2008/0291686 A1 * | 11/2008 | Cull | G09G 3/3406 | 362/471 |
| 2012/0162082 A1 * | 6/2012 | Mori | G06F 1/1649 | 345/173 |
| 2012/0249398 A1 * | 10/2012 | Kanda | H04M 1/0247 | 345/4 |

* cited by examiner

*Primary Examiner* — Kevin M Nguyen

(57) ABSTRACT

A dual resolution display with a shared backlight, including: a decorative panel having a first surface and second surface opposite to the first surface; a backlight module fixed on the second surface of the decorative panel; a first display, disposed between the decorative panel and the backlight module, is configured to display picture content with a first display resolution according to a first display resolution signal; and a second display, adjacent to the first display, the second is configured to display picture content with a second display resolution according to a second display resolution signal. The backlight module provides a blacklight source to the first display and the second display, and the first display and the second display respectively expose a first display area and a second display area on the first surface of the decorative panel. The display area is used to display picture content with different resolutions.

8 Claims, 5 Drawing Sheets

DUAL RESOLUTION DISPLAY WITH A SHARED BACKLIGHT

BACKGROUND OF THE INVENTION

1. Field of the Invention

The present disclosure relates to a dual resolution display, and in particular to a dual resolution display with a shared backlight.

2. Description of the Related Art

Accompanied with the advancement in computer technologies, displays using computer graphics techniques are extensively applied in electronic game machines. A user can perform an operation (for example, moving characters, switching pictures, confirming selections, canceling selections, and inputting text) on picture content displayed on a display by using keys disposed on the electronic game machines, further achieving the object of gaming and entertainment.

In order to attract the attention of users and boost entertaining effects of gaming, multiple different displays are provided on certain electronic game machines, and different picture contents are displayed in individual displays for reference information during gaming of the user, thereby boosting entertaining effects during gaming.

BRIEF SUMMARY OF THE INVENTION

However, when multiple different displays are installed on a same electronic game machine, due to respective backlight modules included in individual displays, the volume of the multiple backlight modules take up a greater installation space, leading to a problem of the electronic game machine becoming larger and heavier and hence the inability in meeting design trends of being lightweight, thin, short and compact.

To achieve the above and other objects, the present disclosure provides a dual resolution display with a shared backlight adapted to receive a display signal and display picture contents with different resolutions corresponding to the display signal. The dual resolution display with a shared backlight includes: a decorative panel, having a first surface and a second surface opposite to the first surface; a backlight module, fixed on the second surface of the decorative panel; a first display, disposed between the decorative panel and the backlight module, the first display configured to receive and correspondingly display picture content with a first display resolution according to a first display resolution signal; and a second display, disposed between the decorative panel and the backlight module and adjacent to the first display, the second display configured to receive and correspondingly display picture content with a second display resolution according to a second display resolution signal; wherein, the backlight module provides a backlight source to the first display and the second display, and the first display and the second display respectively expose a first display area and a second display area on the first surface of the decorative panel, the display areas are used to display the picture content with the first display resolution and the picture content with the second display resolution.

In some embodiments, the dual resolution display with a shared backlight further includes: a signal allocation module, configured to allocate the display signal into a first display signal and a second display signal; a first display signal conversion module, electrically connected to the signal allocation module, the first display signal conversion module configured to receive the first display signal and convert the first display signal into the first display resolution signal; and a second display signal conversion module, electrically connected to the signal allocation module, the second display signal conversion module configured to receive the second display signal and convert the second display signal into the second display resolution signal.

In some embodiments, an appearance shape of the first display area is different from an appearance shape of the second display area.

In some embodiments, the first display area is greater than the second display area.

In some embodiments, the decorative panel further includes a key module, and an appearance shape of the key module is same as the appearance shape of the second display.

In some embodiments, the key module has a third display area used to display picture content different from that of the first display area.

In some embodiments, an appearance shape of the third display area is different from the appearance shape of the second display area.

In some embodiments, the first display receives the first display resolution signal via a Low-Voltage Differential Signaling (LVDS) standard, a High Definition Multimedia Interface (HDMI) standard, a Digital Visual Interface (DVI) standard or an Embedded DisplayPort (eDP) standard.

In some embodiments, the second display receives the second display resolution signal via a Mobile Industry Processor Interface (MIPI) standard.

In some embodiments, the first display resolution is higher than the second display resolution.

In conclusion, the dual resolution display with a shared backlight of the present disclosure provides the backlight source to two displays by means of one backlight module to reduce the installation space occupied by the backlight module, hence solving the problem of the electronic game machine becoming larger and heavier and meeting design trends of being lightweight, thin, short and compact. Moreover, with the design of the dual resolution display, production costs of the dual resolution display with a shared backlight can also be reduced by using a low-resolution display. In addition, the dual resolution display with a shared backlight can boost interaction and entertaining effects during gaming via the key module capable of displaying picture content.

DETAILED DESCRIPTION OF THE INVENTION

Figure 1:
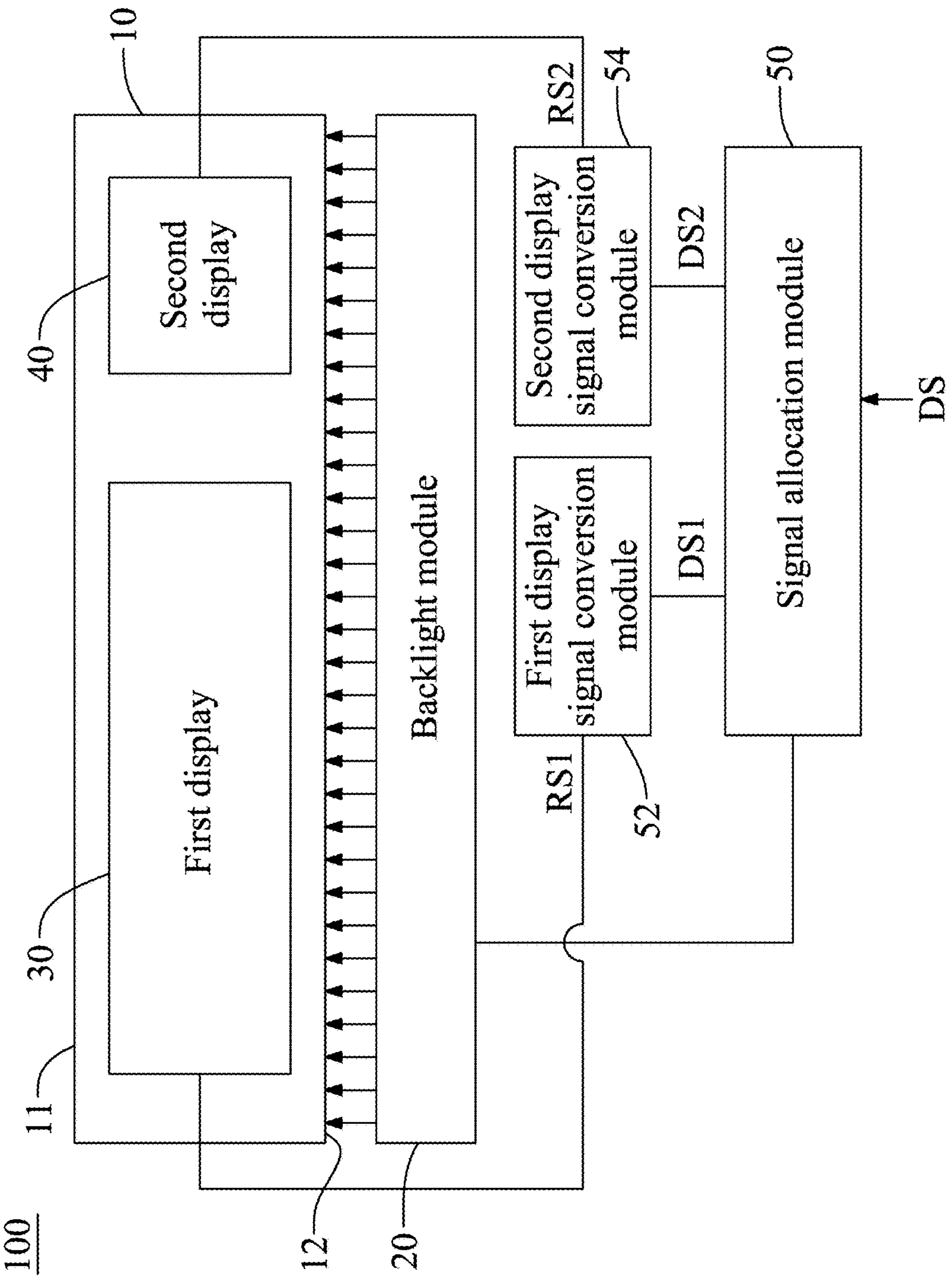
FIG. 1 is a system block diagram of a dual resolution display with a shared backlight according to an embodiment of the present disclosure.
Figure 2:
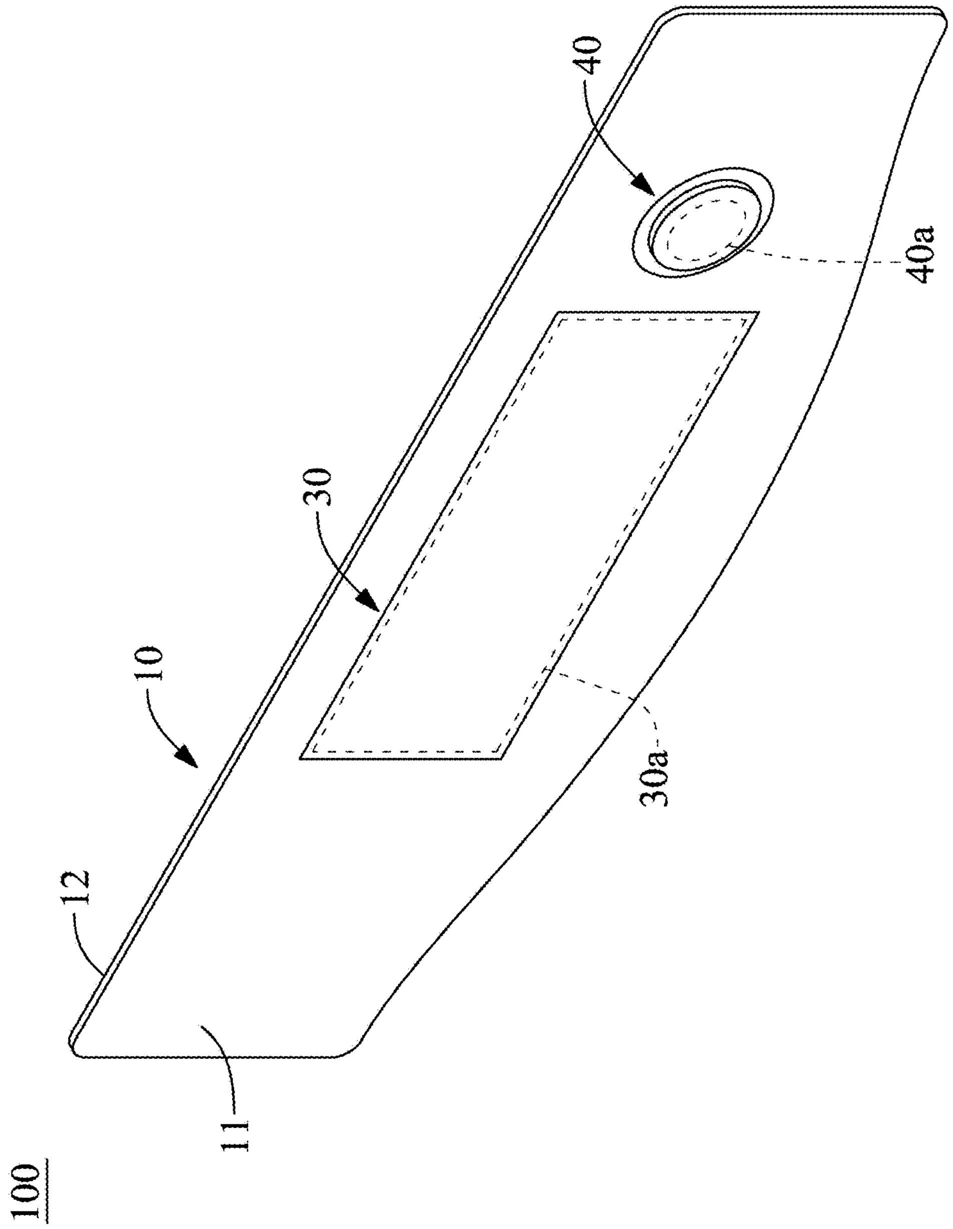
FIG. 2 is an appearance diagram of a dual resolution display with a shared backlight according to an embodiment of the present disclosure.
Figure 3:
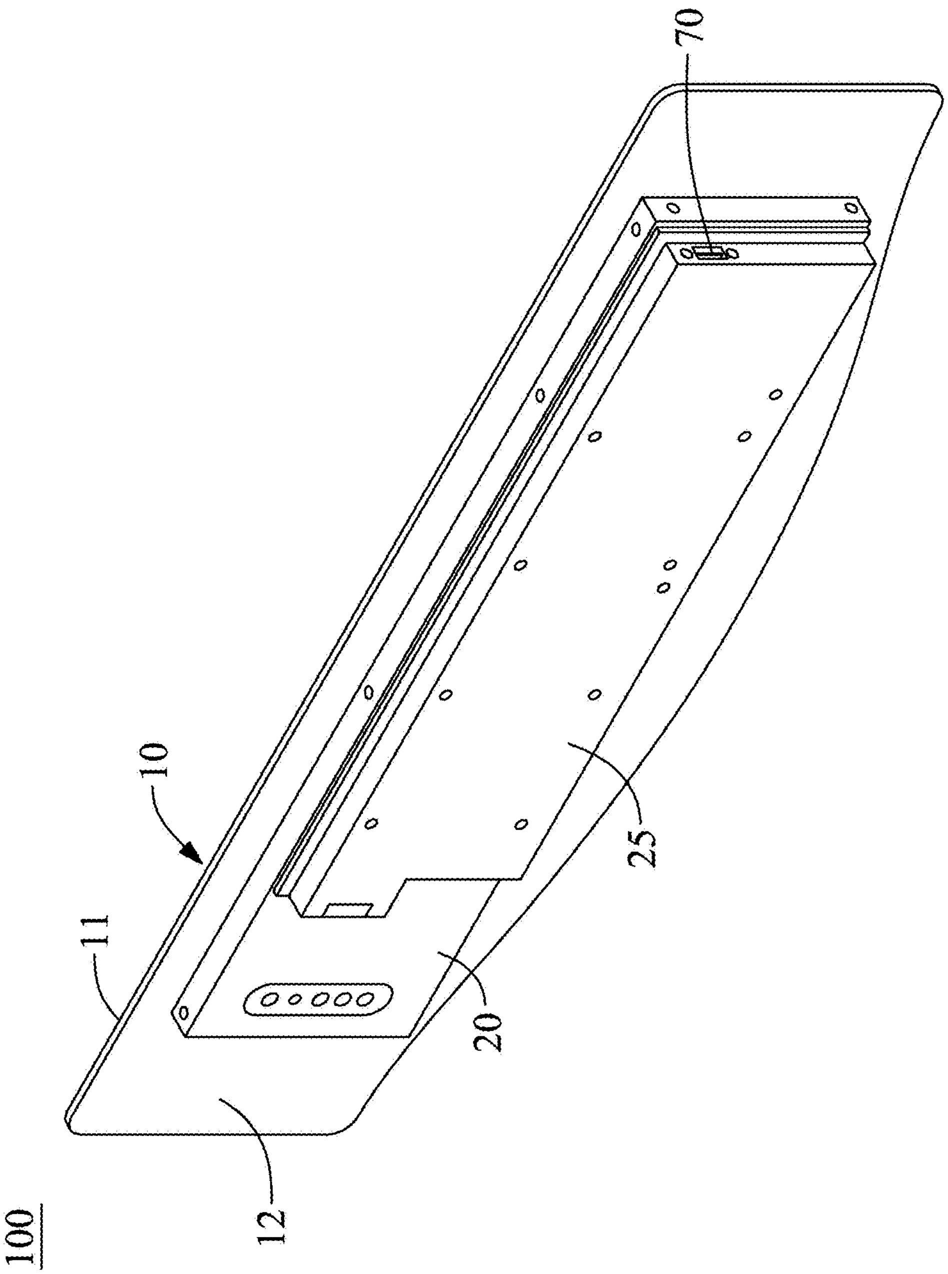
FIG. 3 is another appearance diagram of a dual resolution display with a shared backlight according to an embodiment of the present disclosure.

Referring to FIG. 1, FIG. 2 and FIG. 3, FIG. 1 shows a system block diagram of a dual resolution display 100 with a shared backlight according to an embodiment of the present disclosure, FIG. 2 shows an appearance diagram of a dual resolution display with a shared backlight according to an embodiment of the present disclosure, and FIG. 3 shows another appearance diagram of a dual resolution display with a shared backlight according to an embodiment of the present disclosure.

As shown in FIG. 1, the dual resolution display 100 with a shared backlight includes a decorative panel 10, a backlight module 20, a first display 30, a second display 40, a signal allocation module 50, a first display signal conversion module 52 and a second display signal conversion module 54.

As shown in FIG. 2, the decorative panel 10 has a first surface 11 and a second surface 12 opposite to the first surface 11. The decorative panel 10 is structured as a thin panel. The decorative panel 10 has an appearance substantially shaped as rectangles on three sides and an arc on the one remaining side; however, the present disclosure is not limited to the example above, and can include other geometric shapes. The decorative panel 10 can be made of, for example, glass or acrylic. The first surface 11 of the decorative panel 10 has a light shielding layer (not shown). The light shielding layer can expose a first display area 30*a* of the first display 30 on the first surface 11. An appearance of the first display area 30*a* is substantially shaped as a rectangle.

As shown in FIG. 1 and FIG. 3, the backlight module 20 is fixed on the second surface 12 of the decorative panel 10. The backlight module 20 is electrically connected to the signal allocation module 50. The backlight module 20 can be driven by the signal allocation module 50, so as to provide a backlight source, that is, a shared backlight, to the first display 30 and the second display 40. The first display 30 and the second display 40 can share the backlight source generated by the same backlight module 20, and do not require the use of two separate backlight modules 20. Thus, the dual resolution display 100 with a shared backlight can eliminate the installation space occupied by one backlight module, and solve the problem of the conventional electronic game machine becoming larger and heavier to further meet design trends of being lightweight, thin, short and compact. Moreover, the backlight module 20 can be formed by components such as a reflector, a light source, a light guide, a lower diffuser plate or a condenser sheet. The backlight module 20 can be, for example, a direct-lit backlight, an edge-lit backlight or a full array backlight.

The first display 30 is disposed between the decorative panel 10 and the backlight module 20. The first display 30 is electrically connected to the first display signal conversion module 52. The first display 30 is configured to receive a first display resolution signal RS1 from the first display signal conversion module 52. The first display 30 can correspondingly display picture content with a first display resolution (for example, 1920*536, 1920*1080, 2560*1440 and 3840*2160) according to the first display resolution signal RS1. The first display 30 receives the first display resolution signal RS1 via a Low-Voltage Differential Signaling (LVDS) standard, a High Definition Multimedia Interface (HDMI) standard, a Digital Visual Interface (DVI) standard or an Embedded DisplayPort (eDP) standard. Moreover, an appearance of the first display 30 is substantially shaped as a rectangle.

The second display 40 is disposed between the decorative panel 10 and the backlight module 20. The second display 40 is adjacent to the first display 30. The second display 40 is configured to receive a second display resolution signal RS2 from the second display signal conversion module 54. The second display 40 can correspondingly display picture content with a second display resolution (for example, 800*800) according to the second display resolution signal RS2. The second display 40 receives the second display resolution signal RS2 via a Mobile Industry Processor Interface (MIPI) standard. Moreover, an appearance of the second display 40 is substantially shaped as a circle.

In this embodiment, the first display resolution is different from the second display resolution, and the first display resolution is higher than the second display resolution. A low-resolution display has lower production costs in comparison with a high-resolution display, and therefore the combination above can reduce the overall costs of the dual resolution display 100 with a shared backlight. Moreover, a transmission amount of display data corresponding to a low-resolution display is also less, and thus part of the picture content can be allocated to the low-resolution display (that is, the second display 40) for display, hence enhancing design flexibilities in allocation of the picture content in addition to reducing a data transmission amount of a display signal DS.

The signal allocation module 50 is configured to allocate the display signal DS into a first display signal DS1 and a second display signal DS2. The signal allocation module 50 can be formed by a signal allocation circuit. The signal allocation module 50 can have a connection port 70. The connection port 70 can receive the display signal DS from an external electronic device (for example, a computer or a host). The connection port 70 can be, for example but not limited to, a DisplayPort (DP) interface. Moreover, the signal allocation module 50 in this embodiment can be integrated with a power driving circuit, a power conversion circuit and/or a power storage circuit. Thus, the signal allocation module 50 can further provide power required for operations of the backlight module 20 or other modules.

The first display signal conversion module 52 is electrically connected to the signal allocation module 50. The first display signal conversion module 52 is configured to receive the first display signal DS1 and convert the first display signal DS1 into the first display resolution signal RS1. The first display signal conversion module 52 can be formed by, for example, an analog-to-digital conversion (ADC) circuit.

The second display signal conversion module 54 is electrically connected to the signal allocation module 50. The second display signal conversion module 54 is configured to receive the second display signal DS2 and convert the second display signal DS2 into the second display resolution signal RS2. The second display signal conversion module 54 can be formed by, for example, an analog-to-digital conversion (ADC) circuit.

As shown in FIG. 2, a central location of the decorative panel 10 is an installation position of the first display 30, and a right side of the first display 30 is an installation position of the second display 40. The first display 30 and the second display 40 respectively expose the first display area 30*a* and the second display area 40*a* on the first surface 11 of the decorative panel 10, and the first display area 30*a* and the second display area 40*a* are used to display the picture content with the first display resolution and the picture content with the second display resolution.

An appearance shape of the first display area 30*a* of the first display 30 is different from an appearance shape of the second display area 40*a* of the second display 40. The first display area 30*a* can be greater than the second display area 40*a*. Thus, the first display area 30*a* can display more picture content than the second display area 40, enabling the dual resolution display 100 with a shared backlight to provide more enriched and diversified information display. For example, the first display area 30*a* can display a control picture of motorcycle racing and the second display area 40*a* can display ranking information of current players, hence reinforcing the overall displaying effects of the dual resolution display 100 with a shared backlight by two different display areas.

As shown in FIG. 3, the backlight module 20 is installed on the second surface 12 of the decorative panel 10. An illumination range of the backlight source of the backlight module 20 can cover the first display 30 and the second display 40. Moreover, the connection port 70 is provided on a casing 25 on one side of the backlight module 20. The connection port 70 can receive the display signal DS. The casing 25 can be provided therein with the signal allocation module 50, the first display signal conversion module 52, the second display signal conversion module 54 and other circuit modules.

Figure 4:
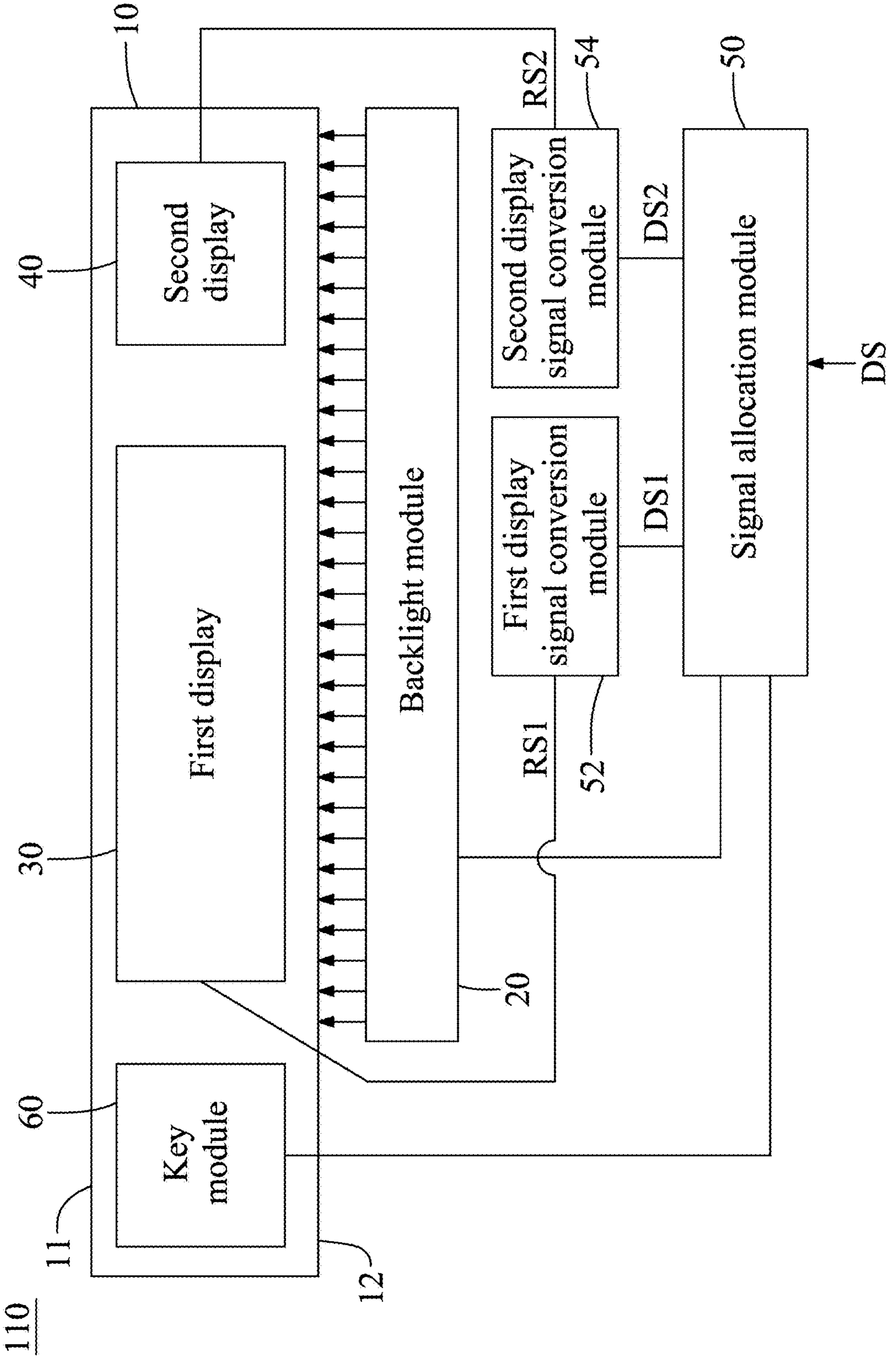
FIG. 4 is a system block diagram of a dual resolution display with a shared backlight according to another embodiment of the present disclosure.

Refer to FIG. 4, FIG. 4 showing a system block diagram of a dual resolution display 110 with a shared backlight according to another embodiment of the present disclosure. As shown in FIG. 4, the embodiment in FIG. 4 differs from the embodiment in FIG. 3 in that, the decorative panel 10 of the dual resolution display 110 with a shared backlight of the embodiment in FIG. 4 further includes a key module 60, and the remaining modules are the same as or similar to those of the embodiment in FIG. 3, and such repeated details are omitted herein.

The key module 60 is electrically connected to the signal allocation module 50. The key module 60 can receive power from the signal allocation module 50. The key module 60 can receive an operation (for example, pressing) from a player, and generate a corresponding operation signal according to an operation result. Moreover, in addition to receiving an operation from a player, the key module 60 can further display picture content. Thus, in addition to reinforcing the overall displaying effects by two different display areas, the dual resolution display 110 with a shared backlight can further boost interaction and entertaining effects during gaming by the key module 60.

Figure 5:
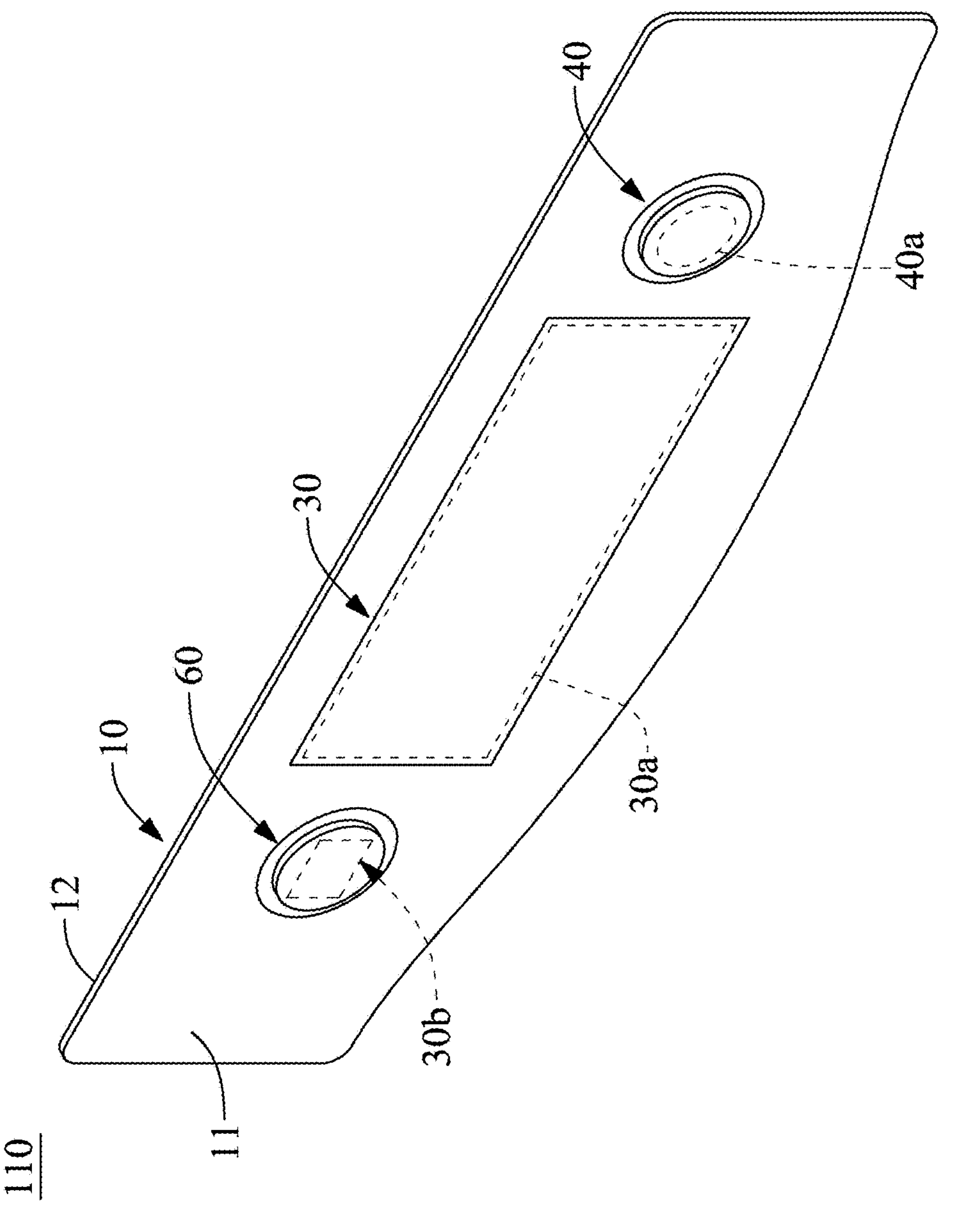
FIG. 5 is an appearance diagram of a dual resolution display with a shared backlight according to another embodiment of the present disclosure.

Refer to FIG. 5 showing an appearance diagram of a dual resolution display 110 with a shared backlight according to another embodiment of the present disclosure. The embodiment in FIG. 5 differs from the embodiment in FIG. 2 in that, a left side of the first display 30 of the embodiment in FIG. 5 is an installation position of the key module 60, and the remaining modules are the same as or similar to those of the embodiment in FIG. 2, and such repeated details are omitted herein.

An appearance shape of the key module 60 is same as the appearance shape of the second display 40. The key module 60 has a third display area 30*b* used to display picture content different from that of the first display area 30*a*. In this embodiment, an appearance shape (for example, a triangle) of the third display area 30*b* is different from the appearance shape (for example, a circle) of the second display area 40*a*. More specifically, the key module 60 itself does not include any display; however, the third display area 30*b* is formed by a structural design having a transparent area, that is, the third display area 30*b* of the key module 60 uses a predetermined area of the first display 30 to display picture content. Thus, the dual resolution display 110 with a shared backlight of the present disclosure can achieve display of the picture contents of three display areas (that is, the first display area 30*a*, the second display area 40*a* and the third display area 30*b*) by using two displays (that is, the first display 30 and the second display 40). In other embodiments, the appearance shape (for example, a circle) of the third display area 30*b* is the same as the appearance shape (for example, a circle) of the second display area 40*a*.

In conclusion, the dual resolution display with a shared backlight of the present disclosure provides a backlight source to two displays by means of one backlight module to reduce the installation space occupied by the backlight module, hence solving the problem of the conventional electronic game machine becoming larger and heavier and meeting design trends of being lightweight, thin, short and compact. Moreover, with the design of the dual resolution display, production costs of the dual resolution display with a shared backlight can also be reduced by using a low-resolution display. In addition, the dual resolution display with a shared backlight can boost interaction and entertaining effects during gaming via the key module capable of displaying picture content.

The present invention is described by way of the preferred embodiments above. A person skilled in the art should understand that, these embodiments are merely for describing the present invention and are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

What is claimed is:

1. A dual resolution display with a shared backlight, adapted to receive a display signal and display picture content with different resolutions corresponding to the display signal, the dual resolution display with a shared backlight, comprising:

a decorative panel, having a first surface and a second surface opposite to the first surface;

a backlight module, fixed on the second surface of the decorative panel;

a first display, disposed between the decorative panel and the backlight module, the first display configured to receive and correspondingly display picture content with a first display resolution according to a first display resolution signal;

a second display, disposed between the decorative panel and the backlight module and adjacent to the first display, the second display configured to receive and correspondingly display picture content with a second display resolution according to a second display resolution signal; and a key module, wherein an appearance shape of the key module is same as an appearance shape of the second display, wherein the backlight module provides a backlight source to the first display and the second display, the first display and the second display respectively expose a first display area and a second display area on the first surface of the decorative panel, and the display areas are used to display the picture content with the first display resolution and the picture content with the second display resolution, and wherein the key module has a third display area used to display picture content different from that of the first display area, the third display area is formed by a structural design having a transparent area, and the third display area of the key module uses a predetermined area of the first display to display the picture content.

2. The dual resolution display with a shared backlight according to claim 1, further comprising:

a signal allocation module, configured to allocate the display signal into a first display signal and a second display signal;

a first display signal conversion module, electrically connected to the signal allocation module, the first display signal conversion module configured to receive the first display signal and convert the first display signal into the first display resolution signal; and a second display signal conversion module, electrically connected to the signal allocation module, the second display signal conversion module configured to receive the second display signal and convert the second display signal into the second display resolution signal.

3. The dual resolution display with a shared backlight according to claim 1, wherein an appearance shape of the first display area is different from an appearance shape of the second display area.

4. The dual resolution display with a shared backlight according to claim 1, wherein the first display area is greater than the second display area.

5. The dual resolution display with a shared backlight according to claim 1, wherein an appearance shape of the third display area is different from an appearance shape of the second display area.

6. The dual resolution display with a shared backlight according to claim 1, wherein the first display receives the first display resolution signal via a Low-Voltage Differential Signaling (LVDS) standard, a High Definition Multimedia Interface (HDMI) standard, a Digital Visual Interface (DVI) standard or an Embedded DisplayPort (eDP) standard.

7. The dual resolution display with a shared backlight according to claim 1, wherein the second display receives the second display resolution signal via a Mobile Industry Processor Interface (MIPI) standard.

8. The dual resolution display with a shared backlight according to claim 1, wherein the first display resolution is higher than the second display resolution.

* * * * *